United States Patent [19]

Christensen

[11] Patent Number: 5,733,650
[45] Date of Patent: Mar. 31, 1998

[54] WEARING SURFACE FOR TIRES FOR WINTER CONDITIONS

[76] Inventor: Erling Christensen, Leikarnes, 6384 Vikebukt, Norway

[21] Appl. No.: 535,151

[22] PCT Filed: Mar. 25, 1994

[86] PCT No.: PCT/NO94/00066

§ 371 Date: Feb. 5, 1996

§ 102(e) Date: Feb. 5, 1996

[87] PCT Pub. No.: WO94/25298

PCT Pub. Date: Nov. 10, 1994

[30] Foreign Application Priority Data

Apr. 26, 1993 [NO] Norway .............................. NO 92 4877

[51] Int. Cl.$^6$ .............................. B60C 11/00; B32B 5/16; C09K 3/14
[52] U.S. Cl. .............................. 428/328; 106/36; 152/210; 152/211; 428/143; 428/551; 428/687
[58] Field of Search .............................. 152/208, 209 R, 152/210, 211; 156/114; 523/149, 150, 152, 153, 159; 106/36; 428/143, 148, 546, 551, 565, 567, 687, 328, 329

[56] References Cited

U.S. PATENT DOCUMENTS

| 2,274,855 | 3/1942 | Wallace | 152/209 R |
| 2,675,047 | 4/1954 | Andy | 152/211 |
| 3,768,535 | 10/1973 | Holden | 152/209 R |
| 4,884,607 | 12/1989 | Mori | 152/209 R |
| 5,162,395 | 11/1992 | Yamazaki et al. | 523/150 X |

FOREIGN PATENT DOCUMENTS

| 0 408 941 A2 | 1/1991 | European Pat. Off. . |
| 0 442 155 A1 | 8/1991 | European Pat. Off. . |
| 0 454 025 A1 | 10/1991 | European Pat. Off. . |
| 3537390 A1 | 4/1987 | Germany . |
| 61-095049 | 5/1986 | Japan . |
| WO 85/05329 | 12/1985 | WIPO . |
| WO 89/06670 | 7/1989 | WIPO . |

Primary Examiner—Michael W. Ball
Assistant Examiner—Francis J. Lorin
Attorney, Agent, or Firm—Fishman, Dionne, Cantor & Colburn

[57] ABSTRACT

A wearing surface for tires includes a rubber or rubber mix and an admixture of friction-improving materials. The admixture of friction-improving materials include a mixture of crystalline chrysolite (olivine) and a metal powder. The metal powder can be steel or an aluminum alloy.

13 Claims, 1 Drawing Sheet

WEARING SURFACE FOR TIRES FOR WINTER CONDITIONS

BACKGROUND OF THE INVENTION

The invention under consideration is a composite material for use as wearing surface on rubber tires for winter conditions.

There are several factors influencing the grip of a car tire on ice and snow, such as the tire design, the non skid pattern as well as the material composition for the wearing surface.

During the past years a lot of research work and money have been spent on developing tires with improved performance, especially for winter driving under icy and slippery road conditions. Especially due to the heavy wear of pavement material experienced with the use of cogged tires and resulting environmental problems, efforts have been made to develop tires for improved performance without using cogs. A lot of design changes in the non skid patterns have been tried, as well as difference rubber mixtures for the wearing surface with or without so called friction increasing elements like grained or particle formed materials embedded.

Examples of the present position of developments may be found by studying the following patent publications: U.S. Pat. No. 2,582,701, U.S. Pat. No. 2,672,910, U.S. Pat. No. 2,675,047, U.S. Pat. No. 2,766,800, U.S. Pat. No. 3,062,255, GB 1578077, EP 442155, FR 2317109, WO 85/05329, DE 2101224, DE 3220603, U.S. Pat. No. 1,578,121, as well as NO applications 903245 and 9033259.

The applicant has performed a number of practical tests covering different rubber mixtures as well as variable proportions of rubber and particles in the wearing surface. Through this work, the applicant has reached the conclusion that parameters like:

range of particle hardness particle size and distribution percentage of particles mixed into the wearing surface material are essential for the friction of the tire against icy and slippery road surfaces. Depending on the hardness level of the material to be mixed in, the applicant has found that the percentage of particles mixed into the wearing surface material may be considerably increased by reducing the grain size.

SUMMARY OF THE INVENTION

Generally speaking, the frictional material for mixing into a wearing surface rubber compound is according to the present invention characterized by a mixture of crystalline chrysolite (olivine) and a metal powder, being for example a steel powder and/or a powder from an aluminium alloy, and if desired an additional friction supporting material having good binding force to the rubber mixture.

A proposed admixture for the frictional material is 20 to 60% by weight, preferably approximately 45% by weight of the total wearing surface compound.

Regarding composition of the frictional material it is suggested, after performing experiments, that the best results are obtained using approximate values of powder materials in the order of 5-20% steel, 30-60% crystalline olivine and additionally, if desired, some powder material.

Regarding particle size it is concluded, after performing experiments, that the materials be finely ground to the extent possible. The olivine powder as well as the other materials used should as an example maintain a particle size of 0.001 to 0.1 mm, the greater part of the particles being preferably in the area 0.0015 to 0.022 mm.

By using a mixture as mentioned above, a particularly stabilized relation between rubber- and friction material will occur due to the nature of the compound and the grading as well.

As the admixture of additional material, this part may as an example consist of coke powder. This coke powder may also partly or as a whole be exchanged by a silicon carbide in powder form, for example, replacing from 3–40% of the coke powder. The use of coke powder in the friction material offers particularly good frictional properties, but the coke powder by itself reduces the wear resistance of the rubber compound. The olivine powder has proved to give a wearing surface with very good frictional properties in addition to the fact that the particle shape is positive for the binding to rubber. It has further been found possible to achieve a very good and homogenous mixture of olivine and steel powder, and the steel has been seen during the vulcanisation process to increase the heat conducting properties of the mixture quite considerably, leading to a better and smoother vulcanization of the tread to the cord. The steel powder also assists in improving wear resistance and steadiness of the tread.

The raw materials of the friction compound are initially mixed in dry condition in a drum mixer or similar for approximately 10 minutes. During this dry mixing process, the olivine powder has demonstrated especially good qualities since it assists in removing possible oxides or other surface coatings from the steel particles. This is important because any kind of coating on the steel particles will reduce the final binding to the rubber mixture. Subsequently a socalled "primer", being in itself of a known type and make, is added, and the stirring is continued for for instance 30 minutes until the primer, originally having a liquid consistence, has been completely mixed with the solid materials and has dried. The treatment with primer is preferably done in two steps with a drying period in between. Primers well suited for the purpose are marketed under the product names Chemosil 211 and Chemosil 220. After the friction compound is readily coated with primer which has been allowed to dry completely, it is mixed into the ordinary wearing surface rubber of the tire.

A preferred way of producing wearing surfaces is according to this invention to feed the friction compound into a mixing machine where it is mixed with the rubber. The final mixture is delivered from the mixing machine in pieces or strips of dimensions suitable for feeding an ordinary extruder where the compound is further extruded to a strip suitable for forming the tread on the tire. After a strip of thickness suitable to form the tread has been applied on the tire, the tread joint is rubbed down using a rowel, and the tire is then shifted to a pressurized and heated vulcanizing form in order to press the tread pattern and vulcanize the tread to the tire in an ordinary and well known manner.

Concerning the steel materials used, these may very well be stainless. Provided the cost of stainless steel is considered being on the higher side, some other high grade steel may as well be considered used, examples may be steel powder qualities marketed under the product names FLEXGRAIN or FERROGENT. Steel powder may also be substituted partly or totally by a granulated or powdered light metal alloy like for instance aluminium alloy AlMg 5 (NS 17552).

The admixture of friction material into the rubber mix may be performed in different ways. At the rubber manufacturer, the friction material may for instance be mixed into the rubber while the latter is still flowing. Alternatively the friction material may be rolled into the rubber mixture while the latter is more or less flowing. As mentioned earlier, friction material as much as 20–60% by weight of the finished rubber mixture into which it is going to be admixed, should be used, preferably the percentage should be around 45.

An important feature of the invention is that the steel powder used is of a grain size similar to the remaining materials confirming the friction compound. Preferably the proportions by weight of the mixture should be 1 part steel powder to 7 parts of the remaining friction compound. This reads a single steel particle may be surrounded by 7 other particles from the friction compound, leading to an improved vulcanization of the entire friction compound into the rubber mix since the heat conduction of steel is better than for the other materials. The rubber is thereby more or less melted onto the particles of the friction material during vulcanization.

Experiments have shown that by using metal powder in the form of an aluminium alloy, the heat conduction from the tire is improved. Less problems with the tire running hot and also reduced wear are therefore expected as a result.

Regarding tread patterns of current interest, the applicant has arrived at the conclusion that, when using the invented compound for the wearing surface, the tread pattern may with advantage be designed with less number of grooves, diagonally as well as radially, so leading to an increased contact area between tire and rad surface. This is due to the new compound increasing the adhesion against ice as compared to what has been the fact for tires till now. Through experiments, the applicant has reached the conclusion that a specially favourable tread pattern may consist of substantially square pieces of material having a flat contact surface against the road, and being dissociated by grooves at right angles to each other in such a way that a set of parallel grooves are running in the longitudinal direction (diagonal grooves), whereas another set are running in the transversal direction of the tire wearing surface (radial grooves).

The groove width should be waning towards the bottom of the groove, for instance 7 mm width at the top decreasing to approximately 5 mm at the bottom. By this, occurrences like slash, snow or ice choking the grooves may be avoided.

A tread pattern preferred by the inventor comprises square blocks having the approximate size of 20×20 mm, separated by grooves of approximately 5 mm width for fast drainage of water.

Car tires having a wearing surface compound consisting of the present invention, may be manufactured as ordinary new tires or by retreading of second hand tires.

BRIEF DESCRIPTION OF THE DRAWINGS

The manufacturing of a car tire by retreading using the present invented compound, is illustrated by the enclosed figures where:

FIG. 2 shows a magnified sector from the FIG. 1 tire, whereas

DESCRIPTION OF THE PREFERRED EMBODIMENTS

Figure 1:
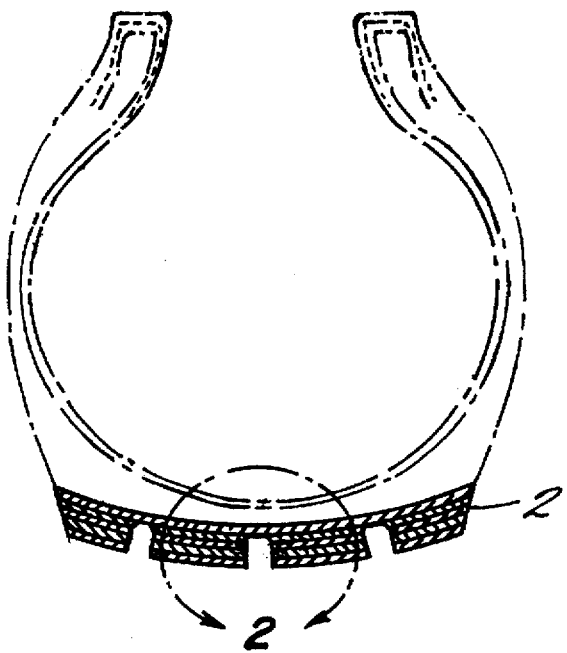
FIG. 1 displays the cross-section of a car tire having a wearing surface applied in layers using a compound similar to the present invention.

FIG. 1 illustrates an ordinary method used for retreading of tires, coiling of the desired number of layers—in this case 5—of an endless strip of wearing surface material 2. When manufacturing tires according to the present invention, a wearing surface material may be used that has got the desired admixture of grained or powder material already in the strip production phase.

Figure 2:
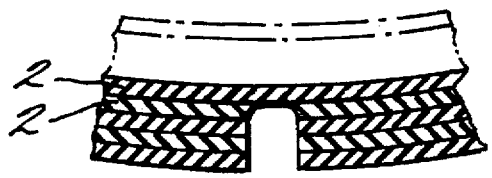

As mentioned earlier, the new wearing surface is vulcanized to the tire in a vulcanizing form at a temperature of typically 150°–165° C. and at a pressure of 7–25 bars. Samples cut from tires retreaded by applying multiple layers of thin strip show, according to the inventor, that the friction compound has been distributed to neighbouring layers of the wearing surface in such a way that the entire wearing surface has got an almost homogenous material structure, schematically illustrated also in FIG. 2. It is appropriate, therefore, to squeeze out the tread pattern in the usual and well known manner during vulcanization without destroying the compound in any way.

Figure 3:
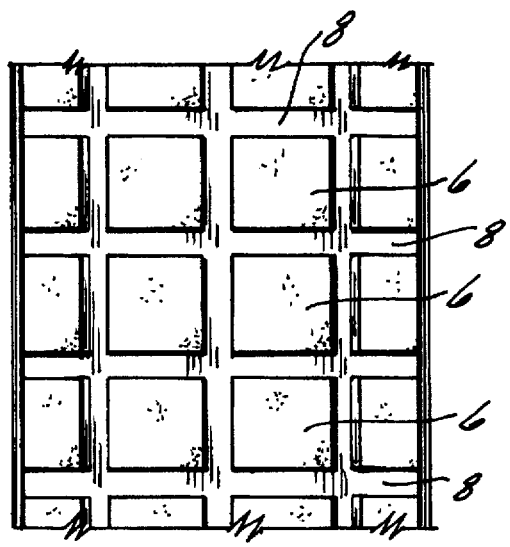
FIG. 3 shows a sector from a tire as described by the inventor, as seen towards the wearing surface from above.

As mentioned before, experiments have shown that tires containing the invented compound in the wearing surface may as well have a relatively bigger pattern contact area. A preferred tread pattern design as proposed by the inventor, is a checked one having the square form 6 shown in FIG. 3 with longitudinal and transversal intermediate grooves for the purpose of good water drainage. Strip- and belt formed wearing surface rubber for use during retreading of tires are usually supplied in different thicknesses ranging from 2 to 3–4 mm. A common thickness range is 3–4 mm. A good mix of the wearing surface compound has been obtained when applied in layers down to a thickness of 2–4 mm.

Having built up a sufficient thickness of the wearing surface using strips of belt, the tire wearing surface is smoothened and the tire is shifted to a vulcanizing form for vulcanization.

I claim:

1. Wearing surface for tires, comprising:
    a rubber or rubber mix; and
    an admixture of friction improving materials, characterized by the friction improving materials constituting approximately 20–60% by weight of the rubber mix, the admixture comprising a mixture of crystalline chrysolite (olivine) powder and a metal powder, the metal powder being selected from the group comprising a steel powder and/or a powder from an aluminum alloy.

2. Wearing surface for tires as stated in claim 1, wherein:
    the friction improving materials comprise approximately 5–20% powdered or granulated steel material, and approximately 30–60% crystalline chrysolite powder.

3. Wearing surface for tires as stated in claim 2 wherein the steel material consists of stainless steel.

4. Wearing surface for tires as stated in claim 1, wherein:
    the metal powder in its entirety consists of a powder from an aluminum alloy.

5. Wearing surface for tires as stated in claim 1, wherein:
    the chrysolite powder has a particle size in the range 0.001–0.1 mm.

6. Wearing surface for tires as stated in claim 5, wherein:
    the major portion of the friction improving materials have a particle size in the range of 0.0015–0.022 mm.

7. Wearing surface for tires as stated in claim 5, wherein:
    the major portion of the chrysolite has a particle size in the range of 0.0015–0.022 mm.

8. Wearing surface for tires as stated in claim 1, wherein:
    the friction improving materials further comprise an additional friction supporting material having a good binding force to the rubber or rubber mixture.

9. Wearing surface for tires as stated in claim 8, wherein:
   the additional friction supporting material comprises coke powder.
10. Wearing surface for tires as stated in claim 1, wherein:
   the metal powder comprises stainless steel.
11. Wearing surface for tires as stated in claim 9, wherein:
   the additional friction supporting compound further comprises silicon carbide.
12. Wearing surface for tires as stated in claim 11, wherein:
   the silicon carbide replaces 3–40% of the coke powder.
13. Wearing surface for tires as stated in claim 1, wherein:
   the friction improving materials have a particle size in the range 0.001–0.1 mm.

* * * * *